US012534383B2

(12) United States Patent
Cardarelli

(10) Patent No.: US 12,534,383 B2
(45) Date of Patent: Jan. 27, 2026

(54) HIGH TEMPERATURE CHEMICAL PROCESS FOR THE PREPARATION OF CESIUM TUNGSTATE

(71) Applicant: Francois Cardarelli, Montreal (CA)

(72) Inventor: Francois Cardarelli, Montreal (CA)

( * ) Notice: Subject to any disclaimer, the term of this patent is extended or adjusted under 35 U.S.C. 154(b) by 1025 days.

(21) Appl. No.: 17/509,355

(22) Filed: Oct. 25, 2021

(65) Prior Publication Data

US 2023/0114534 A1 Apr. 13, 2023

Related U.S. Application Data

(60) Provisional application No. 63/254,471, filed on Oct. 11, 2021.

(51) Int. Cl.
*C01G 41/00* (2006.01)

(52) U.S. Cl.
CPC ........ *C01G 41/006* (2013.01); *C01P 2004/61* (2013.01)

(58) Field of Classification Search
CPC ... C01G 41/00; C01G 41/006; C01P 2004/61; Y02P 10/20
See application file for complete search history.

(56) References Cited

U.S. PATENT DOCUMENTS

| 5,328,035 A | 7/1994 | Duyvesteyn et al. |
| 6,390,395 B1 * | 5/2002 | Young .................. C22B 1/00 241/20 |

FOREIGN PATENT DOCUMENTS

CN 105664920 A * 6/2016

OTHER PUBLICATIONS

CN-105664920 machine translation in english, published 2016 (Year: 2016).*

* cited by examiner

*Primary Examiner* — Smita S Patel

(57) ABSTRACT

The present disclosure broadly relates to a high temperature chemical process for the synthesis of cesium tungstate in the solid state and the preparation of aqueous solutions or deuterated solutions of cesium tungstate. More specifically, but not exclusively, the present disclosure relates to a high temperature chemical process in which tungsten oxide compounds such as tungsten oxides, or natural or synthetic concentrates such as wolframite or scheelite, tungsten industrial by-products or there mixture thereof, are mixed with cesium compounds such as cesium carbonate, or cesium sulfate, or cesium hydroxide or their mixtures thereof and the mixture is roasted in air or oxygen at high temperature inside a kiln. After cooling, the solid sintered mass containing cesium tungstate is leached or dissolved with water or heavy water for producing dense aqueous solutions or deuterated solutions of cesium tungstate.

8 Claims, 4 Drawing Sheets

HIGH TEMPERATURE CHEMICAL PROCESS FOR THE PREPARATION OF CESIUM TUNGSTATE

CROSS-REFERENCE TO RELATED APPLICATIONS

The present application claims the benefit of priority from U.S. provisional application No. 63/254,471 filed on Oct. 11, 2021, the content of which is incorporated herein by reference in their entirety.

FIELD OF THE INVENTION

The present disclosure broadly relates to a high temperature chemical process for the synthesis of cesium tungstate in the solid state and the preparation of aqueous or deuterated solutions of cesium tungstate. More specifically, but not exclusively, the present disclosure relates to a high temperature chemical process in which tungsten oxide compounds such as tungsten oxides, or natural or synthetic concentrates such as wolframite or scheelite, tungsten industrial by-products or there mixture thereof, are mixed with cesium compounds such as cesium carbonate, or cesium sulfate, or cesium hydroxide or their mixtures thereof and the mixture is roasted in air or oxygen at high temperature inside a kiln. After cooling, the solid sintered mass containing cesium tungstate is leached or dissolved with water or heavy water for producing dense aqueous or deuterated solutions of cesium tungstate.

BACKGROUND OF THE INVENTION

Nowadays, most private and government mineralogical and metallurgical laboratories have switched to dense and harmless saturated aqueous solutions of alkali-metals tungstates, metatungstates, iso-polytungstates and heteropolytungstates in replacement of hazardous dense halogenated organic solvents (e.g., bromoform, $CHBr_3$, CAS No. [75-25-2], 2,890 $kg/m^3$, 1,1,2,2-tetrabromoethane, $C_2H_2Br_4$, CAS No. [79-27-6], 2,965 $kg/m^3$, and diiodomethane, $CH_2I_2$, CAS No. [75-11-6], 3,325 $kg/m^3$) and saturated aqueous solutions of salts of highly toxic metals, (e.g., Thoulet's liquor: potassium iodomercurate (3,250 $kg/m^3$), Clerici's solution: mixture of thallium formate and malonate (4,067 $kg/m^3$), Klein's liquor: cadmium borotungstate (3,360 $kg/m^3$), and finally lead sulphamate (3,200 $kg/m^3$)) that were used for decades in the industry as heavy liquids of choice for performing the dense media separation (DMS) ("sink-float method") of heavy minerals, diamond and other gemstones or fossils. Most of them have been currently phased-out in the USA and Canada due to their acute toxicity.

Currently the modern trend in the mineral industry is to use saturated aqueous solutions of: (1) iso-polytungstates such as sodium metatungstate also called sodium polytungstate (SPT) with the chemical formula $Na_6[H_2W_{12}O_{40}]$ CAS No. [314075-43-9] or $3Na_2WO_4 \cdot 9WO_3 \cdot H_2O$ when expressed as separate oxides that was introduced in 1983 in West Germany with a saturated aqueous solution reaching a maximum mass density of 3,120 $kg/m^3$ but with a high dynamic viscosity of 28 mPa·s; (2) hetero-polytungstates with hetero-polyanions exhibiting the so-called "β-Keggin's structure" $[EW_{12}O_{40}]^{n-8}$ with E=B(III), Si(IV), P(V). A typical example of the latter is the lithium silico-tungstate (LST) with the chemical formula $Li_4[SiW_{12}O_{40}]$ or $2Li_2WO_4 \cdot 10WO_3 \cdot SiO_2$ when expressed as oxides that was introduced in the late 1990s yielding an aqueous solution with a mass density of 2,850 $kg/m^3$ at room temperature.

However, the peculiar chemistry of tungsten makes the chemical synthesis of metatungsates and hetero-polytungstates, currently used as heavy liquids, rather complicated. One route consists to the stepwise acidification of an alkali-metal tungstate solution with an acid such as water soluble organic acids such as formic or acetic acid, strong inorganic acids such hydrochloric acid, nitric acid or sulfuric acid and the subsequent evaporation as exemplified in FIG. 1.

Actually, the process usually starts from a synthetic purified solution of the tungstate of an alkali-metal of chemical formula $M_2WO_4$ with M=$Li^+$, $Na^+$, $K^+$, $Rb^+$, and $Cs^+$, that was obtained either from the processing of wolframite or scheelite concentrates by various routes (i.e., alkaline or acidic).

First the pH of the alkali-metal ortho-tungstate or simply tungstate ($M_2WO_4$ with M=$Li^+$, $Na^+$, $K^+$, $Rb^+$, and $Cs^+$) solution is acidified incrementally to adjust the pH between 9 and 6. During, this step, there is formation of the hydrogeno-tungstate anion as follows:

$$WO_4^{2-} + H^+ = [HWO_4] \quad \text{Reaction 1}$$

The following step consists to perform a second acidification down to pH 5. Upon acidification, a condensation reaction occurs between the hydrogeno-tungstate anion and five tungstate anions to yield the type A paratungstate anion $[HW_6O_{21}^{5-}]$, according to the following reaction scheme:

$$[HWO_4^{31}] + 5WO_4^{2-} + 6H^+ = [HW_6O_{21}^{5-}] + 3H_2O \quad \text{Reaction 2}$$

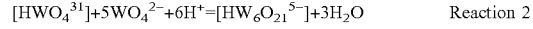

Further condensation upon standing for long periods can produce the type B paratungstate anion instead:

$$2[HW_6O_{21}^{5-}] = [H_2W_{12}O_{42}^{10-}] \quad \text{Reaction 3}$$

In case a third acidification is performed directly on type B paratungstate anion down to a pH ranging between 4 and 2, it yields the metatungstate anion $[H_2W_{12}O_{40}^{6-}]$ as follows:

$$[H_2W_{12}O_{42}^{10-}] + 4H^+ = [H_2W_{12}O_{40}^{6-}] + 2H_2O \quad \text{Reaction 4}$$

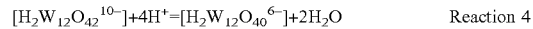

However, if the third acidification is performed on the type A paratungstate anion instead, the chemical reaction scheme comprises two consecutive steps. First, the formation by condensation of the pseudo-metatungstate anion $[W_{11}O_{39}^{12-}]$ occurs as follows:

$$[HW_6O_{21}^{5-}] + 5WO_4^{2-} + 3H^+ = [W_{11}O_{39}^{12-}] + 2H_2O \quad \text{Reaction 5}$$

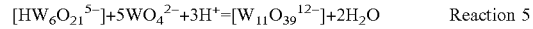

Afterwards, a second condensation occurs between the pseudo-metatungstate and the tungstate anion to yield the metatungstate anion $[H_2W_{12}O_{40}^{6-}]$ as follows:

$$[W_{11}O_{39}^{12-}] + WO_4^{2-} + 8H^+ = [H_2W_{12}O_{40}^{6-}] + 3H_2O \quad \text{Reaction 6}$$

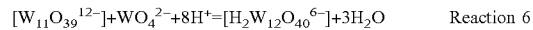

Great care must be exercised during the previous step as greater acidification with a pH ranging between 2 and 1 results in the formation by condensation of the yellow tungstate anion $[W_{10}O_{32}^{4-}]$ as described below:

$$[W_{11}O_{39}^{12-}] + 9WO_4^{2-} + 22H^+ = 2[W_{10}O_{32}^{4-}] + 11H_2O \quad \text{Reaction 7}$$

Moreover, if by mistake the acidification is carried on well below pH 1, the formation of tungstic acid is to be expected according to the following reaction scheme:

$$[W_{10}O_{32}^{4-}] + 8H_2O + 4H^+ = 10H_2WO_4 \cdot H_2O \quad \text{Reaction 8}$$

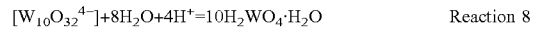

The chemical formula and color of the hydrates of tungstic acid produced during the previous reaction scheme is strongly dependent on the final free acidity and the operating temperature as reported in the TABLE 1.

TABLE 1

Chemical formula and color of hydrated tungstic acid

| Parameters | $H_2WO_4$ | $H_2WO_4 \cdot H_2O$ | $H_2W_{12}O_{40}$ |
|---|---|---|---|
| Free acidity | 2-9N | 0.5-9N | 0.25N |
| Temperature | 100° C. | 25° C. | 25° C. |
| Color | orange-yellow | yellow gel | white |

Therefore, when the metatungstate anion $[H_2W_{12}O_{40}^{6-}]$ must be produced either using the route number 4 or 6 the final pH should remain preferably around 2.7.

The acidification can be also performed by electro-dialysis. The aqueous alkaline solution of the alkali-metal tungstate solution with a pH of approximately 9 is circulated as anolyte through the anode compartment of an electrolyzer with a cation exchange membrane (CEM) white diluted sulfuric acid is used as catholyte. During electrolysis the alkali-metal cation migrates through the CEM yielding alkali-metal sulfate in the cathode compartment. Because of the oxygen gas evolution reaction (OER) the pH drops inside the anode compartment due to the generation of protons $H^+$ and the electrolysis is carried-on until the final pH reaches 3.

The half reaction scheme occurring inside the anode (+) compartment is given by:

$$24M^+ + 12WO_4^{2-} + 16H^+ + H_2O = 24M^+ + H_2W_{12}O_{40}^{6-} + 8H_2O + 0.5O_2(g) + 2e^-$$

The half reaction scheme occurring inside the cathode (−) compartment is given by:

$$20H^+ + 9SO_4^{2-} + 2e^- = H_2(g) + 18H^+ + 9SO_4^{2-}$$

Therefore the overall reaction is depicted as follows:

$$12M_2WO_4 + 9H_2SO_4 = M_6H_2W_{12}O_{40} + 9M_2SO_4 + 0.5O_2 + H_2 + 7H_2O$$

Afterwards, the anolyte is evaporated to the consistency of a syrupy solution from which white crystals can recovered.

Recently, in U.S. Pat. No. 5,328,035 A (BHP Minerals International Inc.), the lithium metatungstate was produced commercially by circulating a dilute solution of lithium tungstate through a fixed bed of a strong base cationic ion exchange resin such as for instance Amberlite® IRA-120 Plus (Amberlite® is a trademark owned by Rohm and Hass) converted to its $H^+$-form. By this method, about 80% of the original lithium cations are exchanged with the protons yielding a dilute aqueous solution of lithium metatungstate that can be concentrated further by thermal evaporation and eventually crystallized.

In U.S. Pat. No. 6,390,395 B1 (Versitech, Inc.) devised the utilization of cesium tungstate, formerly called caesium wolframate with the chemical formula $Cs_2WO_4$, for the separation of heavy minerals by the sink float method. Saturated aqueous solutions of $Cs_2WO_4$ were introduced and adopted commercially since the late 1990s in some private laboratories such as the former Mountain States Research & Development (MSR&D) that was located in Tucson, AZ.

Actually, by contrast with most metatungsates and heteropolytungstates that are slightly acidic in nature (4<pH<6) and thus tends to react with gangue minerals especially carbonates and to react with some active metals including tramp iron, yielding a deep blue solutions with the formation of cesium tungsten bronzes, aqueous solutions of cesium tungstate are slightly alkaline (9<pH<10). The saturated aqueous solution exhibits much higher mass density up to 3,195 kg/m³, a lower dynamic viscosity of only few mPa·s. In addition, the greater thermal stability of aqueous solutions of cesium tungstate that can be evaporated until dryness without decomposition as the anhydrous salt which is highly stable until its melting point. Selected physical properties of the anhydrous cesium tungstate are reported in TABLE 2.

TABLE 2

Physical properties of anhydrous cesium tungstate CAS No. [13587-19-4]

| Physical properties | SI unit |
|---|---|
| Relative molar mass ($^{12}C$ = 12.000) | 513.6485 |
| X-ray density | 5,215 kg/m³ |
| Mass density (helium pycnometer) | 4,950 kg/m³ |
| Phase transition (alpha-to-beta) | 538° C. (811.15 K) |
| Melting point | 958° C. (1231.15 K) |
| Crystal lattice | Orthorhombic |
| Point group | 2/m2/m2/m ($D_{2h}$) |
| Space group (Herman-Mauguin) | Pnma |
| Crystal structure | β-$K_2SO_4$ (Arcanite) |
| Pearson symbol | oP28 |
| Lattice parameters | a = 659.8 pm |
| | b = 1164.7 pm |
| | c = 851.3 pm |
| Optical crystalline properties [Biaxial(+)] | X = b, Y = c, and Z = a |
| | $N_Y = n_m$ = b = 1.668 |
| Formula unit per unit cell | Z = 4 |
| Solubility in water (mass percentage) at 20° C. | 595 grams in 100 grams of pure water (85.6 wt. %) |

Beside its use as aqueous solutions used as heavy media (HMS) for the separation by density of heavy minerals, diamonds and other gemstones or fossils, in mineralogy, petrology and paleontology laboratories, pure cesium tungstate is also used in a plethora of industrial applications such as: (1) precursor for the preparation of catalysts used in the chemical and petrochemical industries; (2) dense media separation (DMS) used alone or as a suspension with powder of tungsten (IV) carbide (WC) CAS No. [1070-12-1] or powder of tungsten (VI) oxide ($WO_3$) CAS No. [1314-35-8] for the processing of kimberlite and lamproite for the recovery of diamonds; (3) x-ray radiographic contrast agents; (4) used as gamma-ray contrast liquid agent in non-destructive testing (NDT) of piping, valves and pump casing; (5) raw material for the preparation of cesium tungsten bronzes; (6) precursor for the processing of synthetic and advanced ceramics; (7) for battery materials and fuel cells; and finally (8) precursor for photochromic thin films.

Currently the synthesis of the cesium tungstate solution is performed by dissolving in a strong caustic solution of cesium hydroxide monohydrate ($CsOH \cdot H_2O$) CAS No. [35103-79-8] either tungsten (VI) oxide ($WO_3$) CAS No. [1314-35-8] or hydrated tungstic acid ($H_2WO_4 \cdot H_2O$) CAS No. [7783-03-1] freshly prepared from the hot acid leaching of natural or synthetic scheelite. Usually a slight excess of tungsten trioxide or tungstic acid in the order of five mass percent must be used to ensure the absence of an excess of free alkalinity at the end of the caustic digestion. The hot caustic digestion process is performed at a temperature ranging from 70° C. to 110° C. with intense stirring for several hours. The final liquor undergoes gravity settling and/or cross flow filtration to remove the traces of unreacted solids, afterwards, the clear aqueous solution must then be evaporated to drive-off most of the water to yield a saturated aqueous solution of cesium tungstate. The overall reaction schemes are as follows:

$$2CsOH + WO_3 = Cs_2WO_4 + H_2O$$

$$2CsOH + H_2WO_4 \cdot H_2O = Cs_2WO_4 + 3H_2O$$

However, the hot caustic digestion route exhibits several technical and commercial drawbacks: (1) the hot caustic dissolution process is rather long taking up to 12 to 24 hours for processing large batches especially when using yellow tungsten (VI) oxide; (2) the strong corrosiveness of the caustic cesium hydroxide lye together with the elevate operating temperature impedes the utilization of usual construction materials such as glassware and austenitic stainless steels. Actually, these materials corrode releasing deleterious impurities, such as silicate and borate anions for the former, and chromate anions for the latter, those will contaminate the final product irretrievably. Hence the process requires to use costly construction and piping materials such as polytetrafluoroethylene (PTFE), perfluoroalkoxy (PFA), pure nickel grade 201 and zirconium alloys such Zircadyne®-702 (Zircadyne® is a trademark owned by ATI-Wah Chang); (3) the maximum allowable pulp density using a concentrated lye of cesium hydroxide available commercially (50 wt. % CsOH) and when expressed as $WO_3$ per unit mass of solution is about 27.9 mass percent of solids. Moreover because the newly formed water during conversion adds up to the original water content of the lye, the maximum mass percentage of the cesium tungstate solution that can be obtained practically from tungsten (VI) oxide is 61.8 wt. % $Cs_2WO_4$. Thus for obtaining a saturated aqueous solution (i.e., 85.6 wt. % $Cs_2WO_4$) it is mandatory to perform a tedious evaporation due to the high boiling point elevation (BPE) of the final concentrated solution leading to a high specific energy consumption of at least 0.34 kWh per kilogram of anhydrous cesium tungstate; finally (4) the elevate cost and scarce commercial availability of concentrated lye of cesium hydroxide due to stringent health and safety and transport regulations makes the processing only practical when conducted onsite or nearby the plant that produces the cesium hydroxide monohydrate.

The present description refers to a number of documents, the content of which is herein incorporated by reference in their entirety.

BRIEF SUMMARY OF THE INVENTION

The present disclosure broadly relates to a high temperature chemical process for the synthesis of cesium tungstate in the solid state and the preparation of aqueous or deuterated solutions of cesium tungstate. More specifically, but not exclusively, the present disclosure relates to a high temperature chemical process in which tungsten oxide compounds such as tungsten oxides, or natural or synthetic concentrates such as wolframite or scheelite, tungsten industrial by-products or there mixture thereof, are mixed with cesium compounds such as cesium carbonate, or cesium sulfate, or cesium hydroxide or their mixtures thereof and the mixture is roasted in air or oxygen at high temperature inside a kiln. After cooling, the solid sintered mass containing cesium tungstate is leached or dissolved with water or heavy water for producing dense aqueous or deuterated solutions of cesium tungstate.

A high temperature chemical process for producing cesium tungstate in the solid state used for producing dense aqueous solutions or deuterated solutions of cesium tungstate, the process comprising:

Mixing tungsten oxide compounds with cesium compounds such as cesium carbonate or cesium sulfate or cesium hydroxide or a mixture thereof; and Roasting the mixture inside a furnace producing a solid sintered mass containing cesium tungstate; and Leaching or dissolving the sintered mass in water or heavy water or a mixture thereof for producing a dense aqueous or deuterated solution of cesium tungstate.

In an embodiment of the present disclosure, wherein the tungsten oxide compounds consist of either pure tungsten oxides such as $W_3O$, $WO_2$, $W_4O_{11}$, $W_{18}O_{49}$, $W_{20}O_{58}$, $WO_3$, or inorganic compounds containing tungsten oxides either mixed physically or combined chemically with other metallic oxides such as natural or synthetic metal tungstates, or mineral concentrates such as wolframite and scheelite or synthetic concentrates or tungsten by-products obtained from metallurgical processing of hardmetal, cermet's, spent catalysts, swarf, scrap tungsten metal and its alloys, and tungsten carbides, or residues from chemical processing of tantalum, tin and tungsten ores and concentrates, or there mixture thereof.

In a further embodiment of the present disclosure the tungsten oxide compounds exhibit a particle size below 0.500 mm, in an embodiment below 0.125 mm, in a further embodiment lower than 0.050 mm.

In a further embodiment of the present disclosure the cesium compounds are made of cesium carbonate ($Cs_2CO_3$) CAS No. [534-17-8] or of cesium sulfate ($Cs_2SO_4$) CAS No. [10294-54-9] or of cesium hydroxide monohydrate ($CsOH \cdot H_2O$) CAS No. [35103-79-8] or there mixture thereof.

In a further embodiment of the present disclosure the cesium compounds exhibit a particle size below 0.500 mm, in an embodiment below 0.125 mm, in a further embodiment lower than 0.050 mm.

In a further embodiment, the present disclosure relates first to a process consisting to perform the mixing of the tungsten oxide compounds with cesium compounds in order to obtain an intimate and homogeneous powder.

In an embodiment, the mass of cesium compounds to be added and mixed with a mass of tungsten oxide compounds is calculated based on the so-called cesium-to-tungsten mass ratio denoted [Cs-to-W] and defined as the mass of cesium metal per mass of tungsten metal which is contained in the tungsten oxide compounds. The cesium-to-tungsten mass ratio [Cs-to-W] ranges from 2.0 kilograms of cesium per kilogram of tungsten down to 1.0 kilogram of cesium per kilogram of tungsten. In a further embodiment, the cesium-to-tungsten mass ratio [Cs-to-W] ranges from 1.8 kilogram of cesium per kilogram of tungsten down to 1.2 kilogram of cesium per kilogram of tungsten. In yet a further embodiment, the cesium-to-tungsten mass ratio [Cs-to-W] ranges from 1.6 kilogram of cesium per kilogram of tungsten down to 1.3 kilogram of cesium per kilogram of tungsten.

In an embodiment, if cesium carbonate is used alone it is convenient to calculate the mass of cesium carbonate to be added and mixed with a mass of tungsten oxide compounds based on the so-called cesium carbonate-to-tungsten (VI) oxide mass ratio denoted [$Cs_2CO_3$-to-$WO_3$] and defined as the mass of anhydrous cesium carbonate per unit mass of tungsten (VI) oxide which is contained in the tungsten oxide compounds. The cesium carbonate-to-tungsten (VI) oxide mass ratio denoted [$Cs_2CO_3$-to-$WO_3$] ranges from 2.0 kilograms of cesium carbonate per kilogram of tungsten (VI) oxide down to 1.0 kilogram of cesium carbonate per kilogram of tungsten (VI) oxide. In a further embodiment, the cesium carbonate-to-tungsten (VI) oxide mass ratio [$Cs_2CO_3$-to-$WO_3$] ranges from 1.8 kilogram of cesium carbonate per kilogram of tungsten (VI) oxide down to 1.2 kilogram of cesium carbonate per kilogram of tungsten (VI)

oxide. In yet a further embodiment, cesium carbonate-to-tungsten (VI) oxide mass ratio [$Cs_2CO_3$-to-$WO_3$] ranges from 1.6 kilogram of cesium carbonate per kilogram of tungsten (VI) oxide down to 1.3 kilogram of cesium carbonate per kilogram of tungsten (VI) oxide.

In yet a further embodiment of the present disclosure, the alkaline roasting is performed at an operating temperature from 300° C. to 1000° C. and in a further embodiment from 600° C. to 900° C.

In yet a further embodiment of the present disclosure, the alkaline roasting is performed during a period that ranges from one (1) hour to twelve (12) hours and in a further embodiment from two (2) hours to six (6) hours.

In yet a further embodiment of the present disclosure, the alkaline roasting is performed in air, in a further embodiment in oxygen-enriched air, and in a further embodiment in pure oxygen gas.

In a further embodiment of the present disclosure, the alkaline roasting is performed inside a crucible.

In yet a further embodiment of the present disclosure, the crucible material is made of refractory ceramics such as electro fused alumina ($Al_2O_3$), electro fused magnesia (MgO), fused zirconia ($ZrO_2$), fused quartz ($SiO_2$), or metals and alloys such as iron and its alloys, nickel and its alloys, zirconium and its alloys, hafnium and its alloys, and silver and its alloys.

In yet a further embodiment of the present disclosure, the alkaline roasting is performed directly inside a kiln.

In yet a further embodiment of the present disclosure, the inside of the kiln is lined with refractory bricks such as electro fused alumina ($Al_2O_3$), electro fused magnesia (MgO), fused zirconia ($ZrO_2$), fused quartz ($SiO_2$).

In yet a further embodiment of the present disclosure, the inside of the kiln is equipped with a tube made of metals and alloys such as iron and its alloys, nickel and its alloys, zirconium and its alloys, hafnium and its alloys, and silver and its alloys.

In yet a further embodiment of the present disclosure, the alkaline roasting is performed batch wise or continuously.

In yet a further embodiment of the present disclosure, after cooling the solid sintered mass obtained is leached with water, $H_2O$, CAS No. [7732-18-5] or deuterium oxide, $D_2O$, CAS No. [7789-20-0] also called heavy water, or there mixtures thereof to obtain a dense aqueous solution or deuterated solution of cesium tungstate.

In yet a further embodiment of the present disclosure, the crude aqueous solution or deuterated solution of cesium tungstate undergoes a solid-liquid separation step by gravity settling, filtration, centrifugation or their combination thereof in order to remove unreacted solids, precipitated solids, and solid impurities.

In yet a further embodiment of the present disclosure, crystals of cesium tungstate can be recovered from the clear solution of cesium tungstate by crystallization either by evaporation under reduced pressure or by freeze drying.

The foregoing and other objects, advantages and features of the present disclosure will become more apparent upon reading of the following nonrestrictive description of illustrative embodiments thereof, given by way of example only with reference to the accompanying drawings, and which should not be interpreted as limiting the scope of the present disclosure.

BRIEF DESCRIPTION OF THE DRAWINGS/FIGURES

DETAILED DESCRIPTION OF THE INVENTION

Glossary

Figure 1:
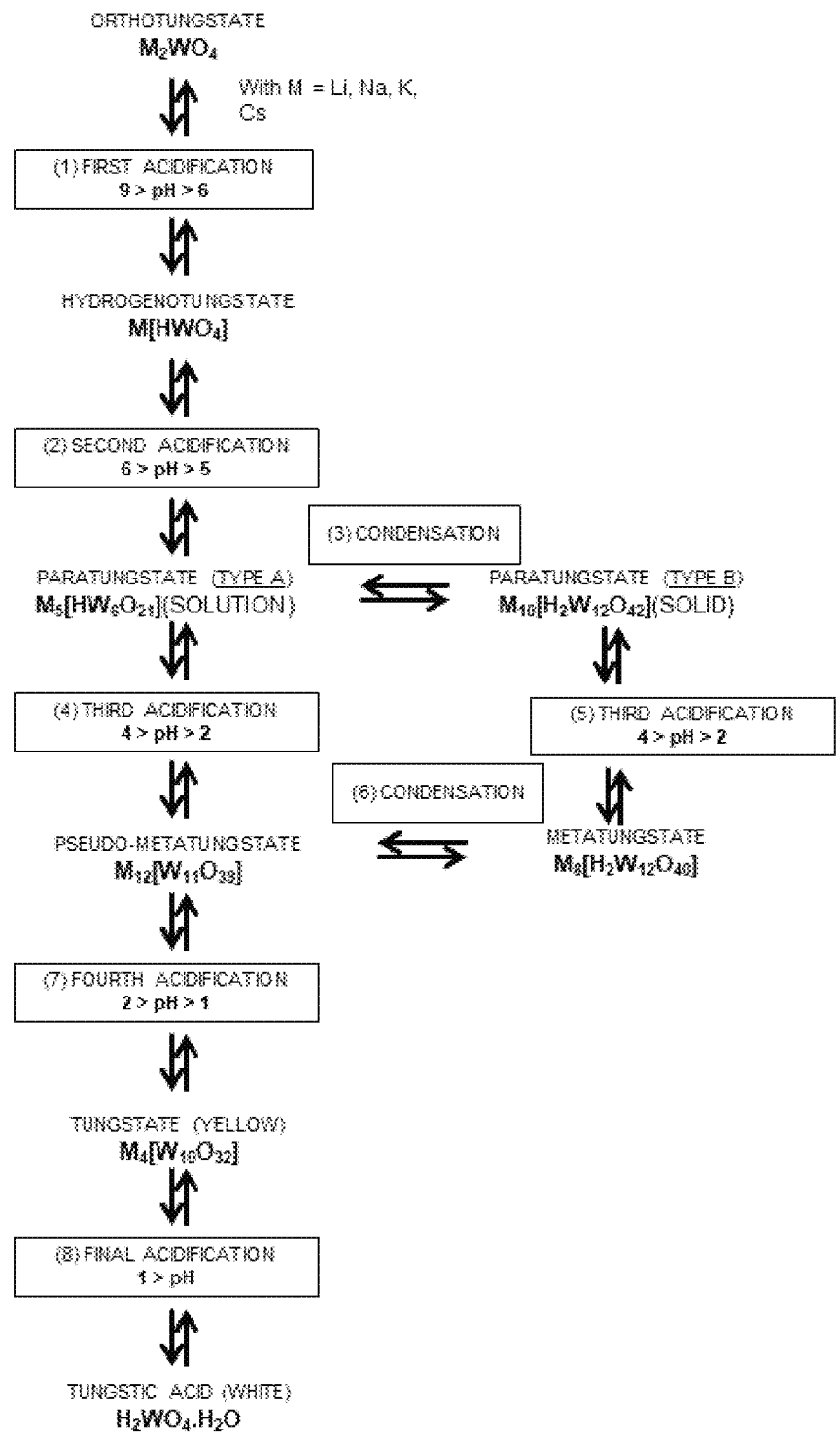
FIG. 1 shows a schematic illustrating specifically the industrial flowsheet regarding the traditional route for performing the synthesis of alkali-metals metatungstates by the acidification of solution of alkali-metal tungstates ($M_2WO_4$ with M=$Li^t$, $Na^t$, $K^t$, $Rb^t$, and $Cs^+$) for comparison to an embodiment of the present disclosure.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Unless otherwise indicated, the definitions and embodiments described in this and other sections are intended to be applicable to all embodiments and aspects of the application herein described for which they are suitable as would be understood by a person skilled in the art.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The term "roasting" or "alkaline roasting" are used broadly to indicate either the heating performed at high temperature in air, or in oxygen-enriched air or in pure oxygen gas.

The term "substantially" as used herein with reference to the process steps disclosed herein means that the process step proceeds to an extent that conversion or recovery of the material is maximized. For example, with reference to recovery of a given metallic value, recovery means that at least 90% of the value is recovered.

The term "tungsten oxide compounds" as used herein with reference to the process steps disclosed herein means either pure tungsten oxides such as $W_3O$, $WO_2$, $W_4O_{11}$, $W_{18}O_{49}$, $W_{20}O_{58}$, $WO_3$, or inorganic compounds containing tungsten oxides either mixed or combined chemically with other metallic oxides as tungstates, or natural or synthetic concentrates such as wolframite and scheelite and tungsten by-products obtained from metallurgical processing of hardmetal, cermet's, spent catalysts, swarf, scrap tungsten metal and its alloys, and tungsten carbides, or the chemical processing of tin, tantalum, and tungsten ores and concentrates, or there mixture thereof.

The present disclosure broadly relates to a high temperature chemical process for the synthesis of cesium tungstate in the solid state and the preparation of aqueous solutions or deuterated solutions of cesium tungstate. More specifically, but not exclusively, the present disclosure relates to a high temperature chemical process in which tungsten oxide compounds such as tungsten oxides, or mineral or synthetic concentrates such as wolframite or scheelite, tungsten industrial by-products or there mixture thereof, are mixed with cesium compounds such as cesium carbonate, or cesium sulfate, or cesium hydroxide or their mixtures thereof and the mixture is roasted in air or oxygen at high temperature inside a kiln. After cooling, the solid sintered mass containing cesium tungstate is leached or dissolved with water or heavy water for producing dense aqueous solutions or deuterated solutions of cesium tungstate.

A high temperature chemical process for producing cesium tungstate in the solid state used for producing dense aqueous solutions or deuterated solutions of cesium tungstate, the process comprising:

Mixing tungsten oxide compounds with cesium compounds such as cesium carbonate or cesium hydroxide or cesium sulfate or a mixture thereof; and Roasting the mixture inside a furnace producing a solid sintered mass containing cesium tungstate; and Leaching or dissolving the sintered mass in water or heavy water or a mixture thereof for producing a dense aqueous solutions or deuterated solution of cesium tungstate.

In an embodiment of the present disclosure, wherein the tungsten oxide compounds consist of either pure tungsten oxides such as $W_3O$, $WO_2$, $W_4O_{11}$, $W_{18}O_{49}$, $W_{20}O_{58}$, $WO_3$, or inorganic compounds containing tungsten oxides either mixed physically (e.g., $WO_3$ mixed with $Ta_2O_5$) or combined chemically with other metallic oxides such as metal tungstates (e.g., $SrWO_4$, $FeWO_4$), or natural or synthetic concentrates such as wolframite (Fe, Mn)$WO_4$ and scheelite ($CaWO_4$) or synthetic concentrates such as precipitated scheelite or tungsten by-products obtained from metallurgical processing of hardmetal, cermet's, spent catalysts, swarf, and tungsten carbides, or residues from the chemical processing of tin, tantalum, and tungsten ores and concentrates, or there mixture thereof. Actually, often tantalum, niobium and tungsten feedstocks that are processed contain significant amount of tungsten under various chemical forms (e.g., scheelite, wolframite, hard metal, tungsten carbide, etc.) that needs to be recovered efficiently. However, prior processing certain tungsten bearing ores and concentrates that can contain sulfide gangue minerals such as stibnite (Sb2S3) or other sulfosalts, it will be that important to remove them if not they will form deleterious soluble sulfosalts and alkaline polysulfides ($M_2S_n$) imparting an amber, orange, red, or pink color to the alkaline solution.

In a further embodiment of the present disclosure the tungsten oxide compounds exhibit a particle size below 0.500 mm, in an embodiment below 0.125 mm, in a further embodiment lower than 0.050 mm. The operation units that can be used for performing the comminution or size reduction of the tungsten oxide compounds are the crushing, the grinding, the ball milling, or the micronizing to obtain the suitable particle size. Nevertheless a particular attention has to be made regarding the selection of the proper construction materials that are in direct contact with the compound in order to avoid the contamination by deleterious impurities or tramp iron. Silicates and free silica must be avoided as the fines particle will reacts chemically.

In a further embodiment of the present disclosure the cesium compounds are made of cesium carbonate ($Cs_2CO_3$) CAS No. [534-17-8] or of cesium sulfate ($Cs_2SO_4$) CAS No. [10294-54-9] or of cesium hydroxide monohydrate ($CsOH \cdot H_2O$) CAS No. [35103-79-8] or there mixture thereof. The former with a melting point of 610° C. usually melt at lower temperature and the liquid formed wets the particles of the tungsten oxide compounds thus increasing the chemical reaction kinetics.

In a further embodiment of the present disclosure the cesium compounds exhibit a particle size below 0.500 mm, in an embodiment below 0.125 mm, in a further embodiment lower than 0.050 mm. As in the case of the tungsten oxide compounds, the operation units that can be used for performing the size reduction of the cesium compounds are the crushing, the grinding, the ball milling, or the micronizing to obtain the suitable particle size. Nevertheless a particular attention has to be made regarding the selection of the proper construction materials that are in direct contact with the compound in order to avoid the contamination by deleterious impurities and tramp iron. The comminution must also be performed in dry dray air or dry inert atmosphere considering the strong hygroscopic behavior of both cesium carbonate, cesium sulfate and cesium hydroxide monohydrate or there mixture thereof.

In a further embodiment, the present disclosure relates first to a process consisting to perform the mixing of the tungsten oxide compounds with cesium compounds in order to obtain an intimate and homogeneous powder. Actually, at high temperature the kinetics of the solid state chemical reaction becomes faster by increasing the intimate contact between the particles of the reactants. Therefore the blending is of paramount importance and it can be performed inside for instance a V-blender, a screw feeder or it can also be obtained by performing the size reduction or comminution of all the reactants mixed together inside a ball mill or micronizer for instance.

In an embodiment, the mass of cesium compounds to be added and mixed with a mass of tungsten oxide compounds is calculated based on the so-called cesium-to-tungsten mass ratio denoted [Cs-to-W] and defined as the mass of cesium metal per unit mass of tungsten metal which is contained in the tungsten oxide compounds. The cesium-to-tungsten mass ratio [Cs-to-W] ranges from 2.0 kilograms of cesium per kilogram of tungsten down to 1.0 kilograms of cesium per kilogram of tungsten. In a further embodiment, the cesium-to-tungsten mass ratio [Cs-to-W] ranges from 1.8 kilogram of cesium per kilogram of tungsten down to 1.2 kilogram of cesium per kilogram of tungsten. In yet a further embodiment, In yet a further embodiment, the cesium-to-tungsten mass ratio [Cs-to-W] ranges from 1.6 kilogram of cesium per kilogram of tungsten down to 1.3 kilogram of cesium per kilogram of tungsten. Actually according to the chemical reaction scheme: $CsCO_3(s)+WO_3(s)=Cs_2WO_4(s)+CO_2(g)$, the stoichiometric cesium-to-tungsten mass ratio [Cs-to-W] is theoretically 1.446 kg however a slight departure from this theoretical value is usually required to address the processing of specific raw materials. For instance when processing pure tungsten (VI) oxide with pure cesium carbonate it is preferable to use a [Cs-to-W] mass ratio very close to 1.45 as any excess of unreacted cesium carbonate will be decomposed into $Cs_2O$ at a high temperature in excess of 600° C. forming upon leaching or dissolution with water caustic cesium hydroxide that will impart free alkalinity of the final cesium tungstate solution produced. On the other hand, when processing wolframite concentrates with cesium carbonate it is preferable to use a certain excess to account for the loss of cesium absorbed during leaching with water by the unreacted solids especially ferric oxides and consumed chemically due to the formation of manganese compounds [e.g., cesium permanganate: $CsMnO_4$ (violet), cesium manganate: $Cs_2MnO_4$ (green), or cesium hypomanganate: $Cs_3MnO_4$ (blue)]. The theoretical mass loss as carbon dioxide gas predicted from the stoichiometry of the previous solid state reaction is 7.9 mass percent. However in practice it can reach up to 10 wt. %. This latter figure is due to the fact that cesium carbonate is strongly hygroscopic and captures some moisture during the mixing together with the moisture content of the tungsten (VI) oxide powder lost as steam during the roasting. And some entrainment of $WO_3$ with steam.

In a further embodiment, when cesium carbonate is used alone it is also convenient to calculate the mass of cesium carbonate to be added and mixed with a mass of tungsten oxide compounds based on the so-called cesium carbonate-to-tungsten (VI) oxide mass ratio denoted [$Cs_2CO_3$-to-$WO_3$] and defined as the mass of anhydrous cesium carbonate per unit mass of tungsten (VI) oxide which is contained in the tungsten oxide compounds. The cesium carbonate-to-tungsten (VI) oxide mass ratio denoted [$Cs_2CO_3$-to-$WO_3$] ranges from 2.0 kilograms of cesium carbonate per kilogram of tungsten (VI) oxide down to 1.0 kilogram of cesium carbonate per kilogram of tungsten (VI) oxide. In a further embodiment, the cesium carbonate-to-tungsten (VI) oxide mass ratio [$Cs_2CO_3$-to-$WO_3$] ranges from 1.8 kilogram of cesium carbonate per kilogram of tungsten (VI) oxide down to 1.2 kilogram of cesium carbonate per kilogram of tungsten (VI) oxide. In yet a further embodiment, cesium carbonate-to-tungsten (VI) oxide mass ratio [$Cs_2CO_3$-to-$WO_3$] ranges from 1.6 kilogram of cesium carbonate per kilogram of tungsten (VI) oxide down to 1.3 kilograms of cesium carbonate per kilogram of tungsten (VI) oxide.

In yet a further embodiment of the present disclosure, the alkaline roasting is performed at an operating temperature from 300° C. to 1000° C. and in a further embodiment from 600° C. to 900° C. Actually the cesium carbonate melts at 610° C. and the cesium sulfate melts only at 1010° C. while cesium tungstate melts at 954° C. However, cesium tungstate also starts to sublimes above 900° C. while other alkali-metal tungstates sublime significantly only above 1000° C. Therefore when using cesium carbonate at roasting temperature greater than 600° C., the molten cesium carbonate tends to wet the particles of the tungsten oxide compounds triggering the liquid sintering while with cesium sulfate this behavior occurs only if the roasting is performed above 1000° C. On the other hand, if the roasting is carried on at temperature above 950° C., upon cooling instead of producing a porous sintered mass, a glassy melted mass is produced. As a general rule, the selection of the proper roasting temperature is a compromise between: (1) obtaining the fastest solid-state chemical reaction kinetics; (2) minimizing the corrosion rate of the container materials, and (3) producing a porous sintered mass.

In yet a further embodiment of the present disclosure, the alkaline roasting is performed during a period that ranges from one (1) hour to twelve (12) hours and in a further embodiment from two (2) hours to six (6) hours. Actually, the duration is directly impacted by the operating temperature, the particle size and intimate mixing, and also by the chemical reactivity of the tungsten oxide compounds.

In a further embodiment of the present disclosure, the alkaline roasting is performed inside a crucible. In yet a further embodiment of the present disclosure, the crucible material is made of refractory ceramics such as electro fused alumina ($Al_2O_3$), electro fused magnesia (MgO), fused zirconia ($ZrO_2$), fused quartz ($SiO_2$), or metals and alloys such as iron and its alloys, nickel and its alloys, zirconium and its alloys, hafnium and its alloys, and silver and its alloys.

Quartz crucibles made of fused silica are satisfactory if the roasting is performed at 600° C. or below as no appreciable reaction was observed between the sintered mass and the quartz walls. However if the process is conducted up to 800° C. for few hours, a slight reaction takes place as revealed by a thin bluish-white brittle layer produced between the sintered mass and the container wall. This layer yielded flakes that can remove easily by sieving after leaching and dissolution. A more costly alternative to quartz crucible especially when no contamination by silica is required is to use pure nickel grade 201 and in a lesser extent zirconium but the latter below 650° C. The slight contamination occurring from nickel oxide (NiO) or zirconia ($ZrO_2$) that form insoluble compounds in the aqueous solution or deuterated solution of cesium tungstate that can be easily removed by gravity, filtration or centrifugation In yet a further embodiment of the present disclosure, the alkaline roasting is performed directly inside a rotary kiln.

In yet a further embodiment of the present disclosure, the inside of the kiln is lined with refractory bricks such as electro fused alumina ($Al_2O_3$), electro fused magnesia (MgO), fused zirconia ($ZrO_2$), fused quartz ($SiO_2$).

In yet a further embodiment of the present disclosure, the inside of the rotary kiln is equipped with a tube made of metals and alloys such as iron and its alloys, nickel and its alloys, zirconium and its alloys, hafnium and its alloys, and silver and its alloys.

In yet a further embodiment of the present disclosure, the alkaline roasting is performed batch wise or continuously. Actually, the discontinuous process is satisfactory for preparing sintered mass of cesium tungstate up to 200 kilograms (441 lb.) per batch per shift. This lower threshold is limited by the commercial availability of large quartz crucible 20-inch OD and 14-inch tall with a capacity of 70 liters and a practical brim capacity of 50 liters. When silica contamination is an issue, it is possible to use crucible made of nickel grade 201 and to remove later the traces of insoluble nickel hydroxide by solid-liquid separation. On the other hand, the continuous process using a rotary kiln is suitable for producing 1,000 kilograms per day (2,240 lb/day).

In yet a further embodiment of the present disclosure, the alkaline roasting is performed in air, in a further embodiment the roasting is performed in oxygen-enriched air, and in a further embodiment the roasting is performed in pure oxygen gas. Actually, operating under oxidizing condition is of paramount importance to ensure that at all time the tungsten remains in the hexavalent oxidation state if not non-stoichiometric phases called "cesium tungsten bronzes" or simply tungsten bronzes are produced with the general chemical formula $Cs_xWO_3$. In these cesium tungsten bronzes, the mean valence of the tungsten ion ranges always between 5 and 6. Moreover, the color depends on the stoichiometric coefficient x, for instance for x=1, the crystalline phase appears yellowish, for x=0.6 the phase appears reddish brown, and finally for x equal or below 0.32 the solid appear metallic blue corresponding to the insoluble phase $Cs_{0.32}WO_3$ (hexagonal). Thus any coloration of the sintered mass is a clear indicator of the oxidizing conditions that existed inside the furnace atmosphere during the roasting. It is important to mention that cesium bronzes are insoluble in water and acids thus their formation is highly detrimental and must be avoided.

In yet a further embodiment of the present disclosure, after cooling the solid sintered mass obtained is leached or dissolved with water, $H_2O$, CAS No. [7732-18-5] or deuterium oxide, $D_2O$, CAS No. [7789-20-0] also called heavy water, or there mixtures thereof to obtain dense aqueous solutions or deuterated solutions of cesium tungstate. Based on the measured solubility at 20° C. of 595 grams of anhydrous cesium tungstate in 100 grams of pure water, it is possible to calculate the theoretical water-to-cesium tungstate mass ratio denoted [$H_2O$-to-$Cs_2WO_4$] which is equal to 0.168 kg of water per kg of $Cs_2WO_4$. The water leaching is usually performed when impure tungsten oxide compounds are processed that contain large amount of chemical elements such as oxides of iron, manganese, calcium, silicon, that will form insoluble solids while the dissolution is utilized when 50 mass percent or more of the sintered mass is made of cesium tungstate that will dissolve. It is mandatory to utilize distilled or demineralized water as traces of calcium from the tap water eventually disturb the solution resulting in a long-term to the precipitation of scheelite ($CaWO_4$). Once the cesium tungstate solution is obtained it is of paramount importance to avoid the contact with certain reducing minerals, rubber, wood, and electrochemically active metals such as iron, zinc, aluminum or their alloys (brass) which reduce the W(VI) producing tungsten bronzes imparting deep blue solutions but austenitic stainless steel when passivated can be used. In case a blue coloration appears witnessing a reduction of W(VI) add few drops of hydrogen peroxide 30 wt. % $H_2O_2$ or allow the bubbling of nascent oxygen gas produced by electrolysis using $IrO_2$-coated mixed metal oxides (MMO) anodes. Caution must be exercised to do not exceed a certain oxidation-reduction potential (ORP) in order to prevent the formation of pertungstates.

In yet a further embodiment of the present disclosure, the crude aqueous or deuterated solution of cesium tungstate undergoes a solid-liquid separation step by gravity settling, filtration or centrifugation or a combination thereof in order to remove eventually unreacted solids, precipitated solids, and solid impurities. At any time, do not utilize mineral ion exchangers for removing deleterious impurities as natural or synthetic zeolites and feldspathoids can exchange their $Na^+$ and $K^+$ cations with $Cs_2WO_4$ resulting in the formation of less soluble and/or precipitated crystals of $Na_2WO_4$ and $K_2WO_4$.

In yet a further embodiment of the present disclosure, crystals of cesium tungstate can be recovered from the clarified solution of cesium tungstate by crystallization either by evaporation under reduced pressure, cooling or by freeze drying. Because, the anhydrous product is extremely hygroscopic (i.e., moisture sensitive) which is also true for highly concentrated solutions, it is important to drip the crystals and store them under dry conditions or bagged under vacuum. Under certain conditions the product can be evaporated in stainless steel pan but if the surface is slightly oxidized, a slight amber coloration appears in the long run because of the release of traces of chromate anions ($CrO_4^{2-}$). However, if detected it can be converted to Cr(III) by adding hydrogen peroxide and filtering the precipitate of $Cr(OH)_3$ that forms. The crystallization of $Cs_2WO_4$ from saturated solution due to slight temperature changes does not represent really an issue because the newly formed crystals readily dissolved back upon addition of water.

In some instance, the reason for using deuterium oxide, $D_2O$, CAS No. [7789-20-0] also called heavy water instead of water or there mixtures thereof is because the maximum mass density of saturated aqueous solutions of cesium tungstate prepared with pure water reaches only 3,195 kg/m³ at 20° C. while when heavy water is used instead to prepare a saturated deuterated solution the mass density reaches 3,300 kg/m³.

The foregoing and other objects, advantages and features of the present disclosure will become more apparent upon reading of the following nonrestrictive description of illustrative embodiments thereof, given by way of example only with reference to the accompanying drawings, and which should not be interpreted as limiting the scope of the present disclosure.

Experimental

A number of examples are provided herein below, illustrating the efficiency of the process of the present disclosure in the preparation of solid cesium tungstate and aqueous solutions or deuterated solutions of cesium tungstate by the high temperature roasting of mixture of tungsten oxide compounds and cesium compounds.

Figure 2:
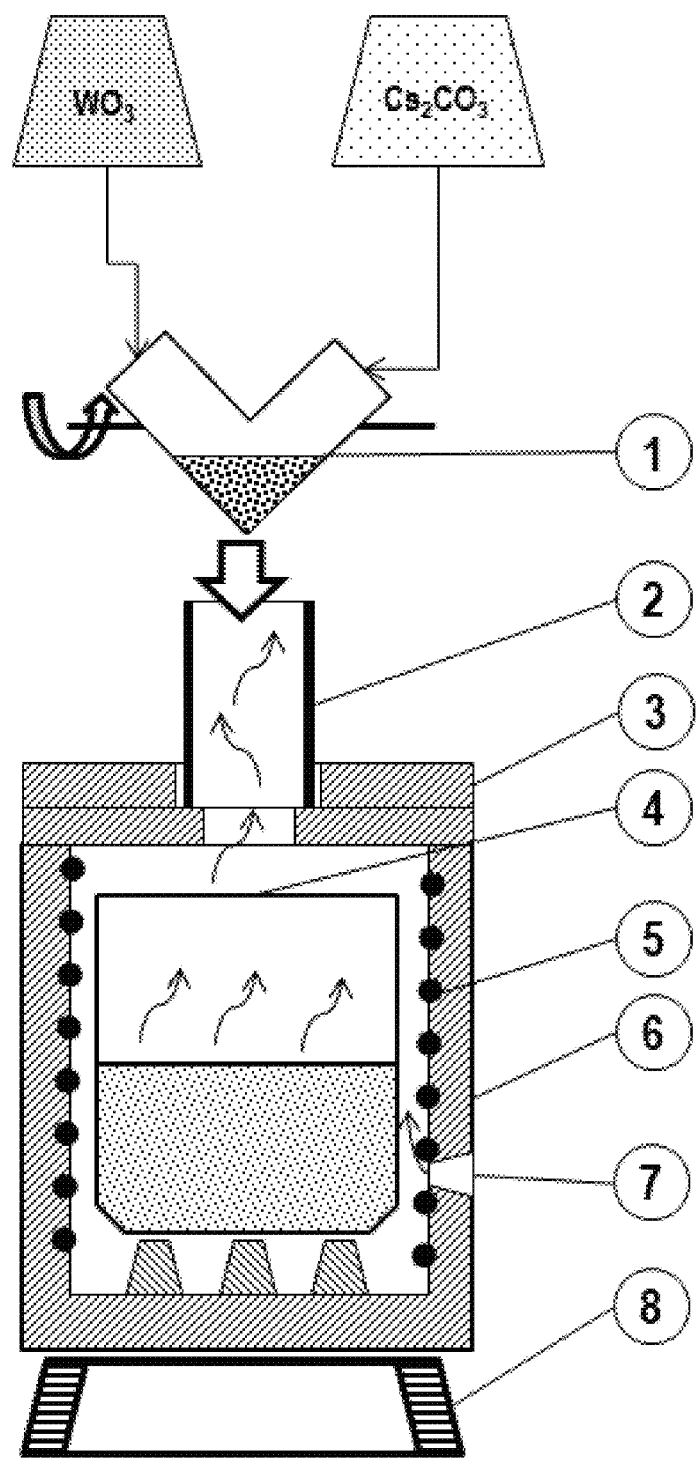
FIG. 2 shows the experimental pilot plant setup including the V-blender and shaft kiln hosting the quartz crucible for the production of cesium tungstate to an embodiment of the present disclosure.

Example 1: Pilot plant setup for performing the high temperature chemical process: A schematic pilot plant setup for preparing the cesium tungstate from pure and finely ground yellow tungsten (VI) oxide, $WO_3$, CAS No. [1314-35-8] intimately mixed with anhydrous cesium carbonate, $Cs_2CO_3$, CAS No. [534-17-8] in accordance with an embodiment of the present disclosure is shown in FIG. 2. where (1) is the stainless steel V-blender, (2) is the 6-inch OD and 12-inch (30.48 cm) tall chimney made of heat-resistant stainless steel grade AISI 310 (Fe-25Cr-20Ni) for evacuating the exhaust gases, i.e., steam and carbon dioxide; (3) are the two 3-inch thick refractory lids; (4) is the 25-liter fused quartz crucible with ¼-inch wall thickness, an inner diameter of 14 inches (35.56 cm) and 11-inch (27.94 cm) tall supplied by AdValue Technology (Tucson, AZ, USA); (5) the coiled Kanthal®-A1 heating elements (Kanthal® is a Trademark owned by Sandvik AB); (6) is the upright 5.55-kW shaft kiln model KM818 from Skutt Ceramic Products (Portland, OR, USA); (7) the peephole, i.e., an opening, for circulating air inside the kiln or injecting oxygen gas in the furnace atmosphere during the roasting, and finally (8) is the heavy duty galvanized carbon steel stand.

Figure 3:
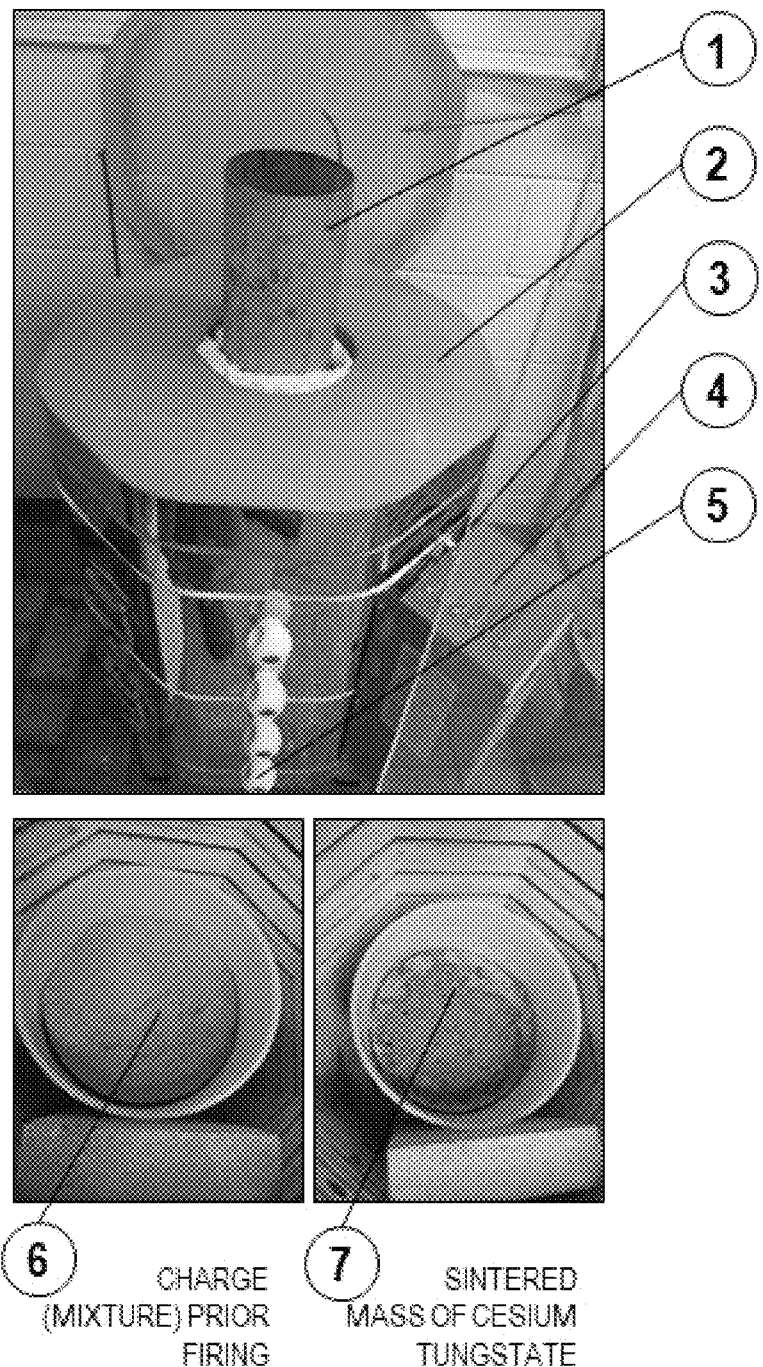
FIG. 3 depicts the photograph of the shaft kiln used for the roasting along with the pictures of the mixture prior performing the firing and the sintered mass of cesium tungstate after cooling to an embodiment of the present disclosure.

The photograph of the kiln is depicted in FIG. 3 where (1) denotes the chimney for evacuating the steam and carbon dioxide; (2) denotes the two top refractory lids; (3) denotes the upright 5.55-kW shaft kiln; (4) denotes the automatic temperature control box; (5) denotes the plugged bottom peephole; (6) denotes the inside of the kiln with the fused quartz crucible installed and containing the intimate mixture of yellow tungsten (VI) oxide, $WO_3$, and cesium carbonate, $Cs_2CO_3$, prior firing; and finally (7) denotes the inside of the kiln with the fused quartz crucible containing the sintered mass of cesium tungstate obtained after firing at 816° C. during 3 hours and after cooling during 12 hours.

Example 2: Selection of crucible construction materials: Several large size crucibles with a capacity ranging from 10 liters up to 25 liters were used for the trials during the pilot testing campaign. The construction materials that were tested at our facilities were made of: (1) fused quartz of the chemical processing grade (AdValueTec, Tucson, AZ, USA); (2) pure nickel grade 201 (99.6 wt. % Ni), (3) pure zirconium such as Zircadyne® grade 702 (Zircadyne® is a trademark owned by ATI-Wah Chang) [99.2 wt. % (Zr+Hf)], and finally (4) heat-resistant stainless steel grade AISI 310 (65 wt. % Fe-25 wt. % Cr-20 wt. % Ni). In the particular case of the fused quartz crucibles during the roasting process below 600° C. no appreciable reaction was observed after firing between the solid sintered mass and the quartz walls. However, when operating above 700° C. and below 850° C., we observed that a slight solid state chemical reaction took place as revealed upon cooling by a thin bluish white layer produced between the sintered mass and the quartz container wall. Alternately, when utilizing a large crucible with 12-inch OD and 15-inch tall and made of welded ¼-inch sheets of pure nickel grade 201, no significant contamination occurred in the final solution of cesium tungstate as the traces of greenish nickel oxide particles produced were easily removed from the aqueous solution by cross flow filtration. When using a large 12-inch OD and 15-inch tall crucible made of pure zirconium metal, the tan thin zirconia layer that formed inside was impervious and it did not contaminate the final product. Finally, we have also tested a large 12-inch OD and 15-inch tall crucible made of heat-resistant stainless steel grade AISI 310, in this particular case, a slight corrosion occurred at the inside wall surface releasing hexavalent chromium (VI) producing a yellowish chromate anion ($CrO_4^{2-}$) that contaminated the aqueous solution of cesium tungstate imparting a yellowish tint that was removed chemically by reducing the chromate with hydrogen peroxide and filtering the chromium hydroxide flocks that formed.

Example 3: Preparation of cesium tungstate from the alkaline roasting of yellow tungsten trioxide and cesium carbonate: The preparation consisted first to mix thoroughly the pure yellow tungsten (VI) oxide, $WO_3$, CAS No. [1314-35-8] powder with the white powder of anhydrous cesium carbonate, $Cs_2CO_3$, CAS No. [534-17-8] inside a blender. The yellow tungsten (VI) oxide (YTO) was produced by Electrochem Technologies & Materials Inc. (Montreal, QC, Canada) from the processing of industrial tungsten by-products and its chemical composition is reported in TABLE 3.

TABLE 3

| Chemical composition and specifications of yellow tungsten (VI) oxide CAS No. [1314-35-8] Tungsten (VI) oxide (Yellow) (−16 mesh) | |
| --- | --- |
| Purity ($WO_3$): | 99.8 wt. % |
| Major impurities: | mg/kg |
| Fe | 20 |
| Mo | 23 |
| V | 20 |
| Na | 12 |
| K | 8 |
| Ca | 10 |
| Si | 10 |

The anhydrous cesium carbonate $Cs_2CO_3$, CAS No. [534-17-8] was supplied by Cabot Specialty Fluids (Lac du Bonnet, MB, Canada) Lot No. 8101-125D with its chemical composition reported in TABLE 4.

TABLE 4

| Chemical composition and specifications of anhydrous cesium carbonate CAS No. [534-17-8] Cesium carbonate (anhydrous) (−20 mesh) | |
| --- | --- |
| Purity ($Cs_2CO_3$): | 99.9 wt. % |
| Major impurities: | mg/kg |
| Na | 150 |
| Rb | 62 |
| Al | 35 |
| K | 15 |
| Zn | 34 |
| Ti | 22 |
| Li | 5 |

Each batch of intimate mixture was then poured inside is the 17-liter fused quartz crucible with ¼-inch wall thickness, an inner diameter of 12 inches (30.48 cm) and 11-inch (22.86 cm) tall supplied by AdValue Technology (Tucson, AZ, USA). The crucible was then installed inside an upright 5.55-kW shaft kiln model KM818 from Skutt Ceramic Products (Portland, OR, USA). The heating rate was 1000° F./hour (538° C./hour) and once a constant temperature of 1500° F. (816° C.) was reached the firing was carried-on from 2 to 3.5 hours. The operating conditions used for processing the eleven batches are reported in TABLE 5.

TABLE 5

Operating conditions for the preparation of cesium tungstate from the alkaline roasting of tungsten (VI) oxide and cesium carbonate

| Alkaline roasting trials | $WO_3$ (kg) | $Cs_2CO_3$ (kg) | Solid mixture (kg) | Temp. | Firing time | [$Cs_2CO_3$-to-$WO_3$] | Firing time per unit mass | Sintered mass (kg) | Weight loss |
|---|---|---|---|---|---|---|---|---|---|
| Batch AR-01 | 1.929 | 3.003 | 4.932 | 1500° F. | 2.0 hours | 1.56 kg/kg | 0.41 hour/kg | 4.400 | −10.8% |
| Batch AR-02 | 2.430 | 3.596 | 6.026 | 1500° F. | 2.0 hours | 1.48 kg/kg | 0.33 hour/kg | 5.412 | −10.2% |
| Batch AR-03 | 2.482 | 3.500 | 5.982 | 1500° F. | 3.5 hours | 1.41 kg/kg | 0.59 hour/kg | 5.360 | −10.4% |
| Batch AR-04 | 2.633 | 3.865 | 6.498 | 1500° F. | 2.0 hours | 1.47 kg/kg | 0.31 hour/kg | 5.880 | −9.5% |
| Batch AR-05 | 2.845 | 4.264 | 7.109 | 1500° F. | 3.0 hours | 1.50 kg/kg | 0.42 hour/kg | 6.376 | −10.3% |
| Batch AR-06 | 3.065 | 4.359 | 7.424 | 1500° F. | 3.0 hours | 1.42 kg/kg | 0.40 hour/kg | 6.757 | −9.0% |
| Batch AR-07 | 3.422 | 5.043 | 8.465 | 1500° F. | 3.0 hours | 1.47 kg/kg | 0.35 hour/kg | 7.574 | −10.5% |
| Batch AR-08 | 3.433 | 5.124 | 8.557 | 1500° F. | 3.0 hours | 1.49 kg/kg | 0.35 hour/kg | 7.752 | −9.4% |
| Batch AR-09 | 4.651 | 6.607 | 11.257 | 1500° F. | 3.5 hours | 1.42 kg/kg | 0.31 hour/kg | 10.058 | −10.7% |
| Batch AR-10 | 4.684 | 6.632 | 11.316 | 1500° F. | 3.5 hours | 1.42 kg/kg | 0.31 hour/kg | 10.080 | −10.9% |
| Batch AR-11 | 4.550 | 6.414 | 10.964 | 1500° F. | 3.5 hours | 1.41 kg/kg | 0.32 hour/kg | 9.800 | −10.6% |
| Total = | 36.124 | 52.407 | 88.531 | 1500° F. | 32.0 hours | 1.45 kg/kg | 0.36 hour/kg | 79.449 | −10.3% |

From the TABLE 5 we can see that a total of 79.449 kg of sintered mass of cesium tungstate, $Cs_2WO_4$, CAS No. [13587-19-4] were produced with an average cesium carbonate to tungsten (VI) oxide mass ratio [$Cs_2CO_3$-to-$WO_3$] of 1.45 kg/kg close to the stoichiometric ratio of 1.405 kg/kg. The firing was performed at 1500° F. (816° C.) with a firing time per batch ranging from 2.0 hours to 3.5 hours corresponding to an average firing time per unit mass of charge of 0.36 hour per kg. The observed mass loss was on average minus 10.3 mass percent, that is, higher than the minus 7.9 mass percent loss predicted from the stoichiometry of the solid state chemical reaction. This discrepancy must be attributed because cesium carbonate is strongly hygroscopic and captures moisture during mixing, together with the residual moisture content of the tungsten (VI) oxide powder both lost as steam during the roasting. Moreover, the mixture of superheated steam and carbon dioxide gas evolving tend to volatilize some tungsten (VI) oxide. Even if this entrainment by the moist gas is significant above 900° C., it was observed already at 800° C. as clearly indicated by the fine yellow dust of $WO_3$ deposited on the colder parts such as the inner surface of the chimney of the kiln.

Example 4: Preparation of saturated aqueous solution of cesium tungstate by dissolving the sintered mass in water: The preparation of the saturated aqueous solution of cesium tungstate consisted to add incrementally minimum volumes of pure deionized water directly inside the fused quartz crucible containing the cooled sintered mass. After each water addition, an excess of undissolved solid remained in order to ensure the saturation of the aqueous solution produced. Then the saturated aqueous solution was drained carefully into a 1.25-gallon (4.73 L) PP carboy® and the operation repeated until a small amount of undissolved solid remained at the bottom. The crude saturated solution of cesium tungstate was allowed to settle by gravity overnight and then underwent a cross flow filtration to remove fine particulates. The clear saturated solution of cesium tungstate exhibited a colorless or slight amber hue depending on the traces of cesium hydroxide present. The operating conditions used for the dissolution of 14 batches of sintered mass are reported in TABLE 6.

TABLE 6

Operating conditions for the preparation of saturated aqueous solutions of cesium tungstate from the dissolution of the sintered mass with cold water.

| Dissolution | Sintered mass (kg) | Water (kg) | Aqueous solution (kg) | Insoluble solids (kg) | Mass density (kg/m³) | Recovery | [W-to-S] |
|---|---|---|---|---|---|---|---|
| Batch WD-01 | 0.683 | 0.114 | 0.75 | 0.05 | 3,160 | 94.1% | 0.167 |
| Batch WD-02 | 2.397 | 0.400 | 2.75 | 0.05 | 3,185 | 98.2% | 0.167 |
| Batch WD-03 | 3.615 | 0.665 | 4.22 | 0.06 | 3,185 | 98.7% | 0.184 |
| Batch WD-04 | 2.178 | 0.365 | 2.50 | 0.04 | 3,200 | 98.3% | 0.168 |
| Batch WD-05 | 2.862 | 0.478 | 3.30 | 0.04 | 3,200 | 98.8% | 0.167 |
| Batch WD-06 | 2.802 | 0.450 | 3.20 | 0.05 | 3,200 | 98.4% | 0.161 |
| Batch WD-07 | 4.740 | 0.690 | 5.35 | 0.08 | 3,200 | 98.5% | 0.146 |
| Batch WD-08 | 3.910 | 0.641 | 4.50 | 0.05 | 3,210 | 98.9% | 0.164 |
| Batch WD-09 | 2.752 | 0.458 | 3.15 | 0.06 | 3,178 | 98.1% | 0.166 |
| Batch WD-10 | 5.448 | 0.909 | 6.25 | 0.11 | 3,200 | 98.3% | 0.167 |
| Batch WD-11 | 6.757 | 1.100 | 7.22 | 0.16 | 3,200 | 91.9% | 0.163 |
| Batch WD-12 | 10.258 | 1.784 | 11.82 | 0.30 | 3,200 | 98.1% | 0.174 |
| Batch WD-13 | 10.360 | 2.448 | 12.26 | 0.13 | 3,200 | 95.7% | 0.236 |
| Batch WD-14 | 10.060 | 2.512 | 12.52 | 0.18 | 3,200 | 99.6% | 0.250 |
| TOTAL = | 68.822 | 13.014 | 79.79 | 1.36 | 3,194 | 97.5% | 0.177 |

From the TABLE 6, we can see that 68.8 kg of saturated aqueous solution of cesium tungstate were produced with average water-to-sintered mass ratio denoted [W-to-S] of 0.177 kg/kg. Actually, except for the four tests WD-03, WD-07, WD-13 and WD-14, the remaining tests were performed using water-to-sintered mass ratio denoted [W-to-S] close to the theoretical water-to-cesium tungstate mass ratio denoted [$H_2O$-to-$Cs_2WO_4$] which is equal to 0.168 kg of water per kg of $Cs_2WO_4$. The average mass density of the saturated aqueous solution produced was 3,194 kg/m³. The observed mass of insoluble solids left-over consisted mainly of unreacted tungsten oxides together with some cesium silicotungsate of theoretical formula $Cs_4[SiW_{12}O_{40}]\cdot 9H_2O$ that formed by the reaction between the cesium tungstate and silica especially with the last five batches. The average recovery yield was however very satisfactory at 98%. As the inside wall of the fused quartz crucible was slightly corroded at the end of the piloting trials.

Example 5: Removal of silica (desilication): Because aqueous solutions of $Cs_2WO_4$ are alkaline (pH 9-10) unlike solutions of alkali-metals meta-tungstates and hetero-polytungstates that are slightly acidic (pH 4-6), it is seldom that traces of silicate anions are present in the crude solution of cesium tungstate produced as observed in the previous example. This contamination originates either from the contamination by the wall of the fused quartz crucible or due to prolonged heating or evaporating the solution inside glassware. Currently in the tungsten industry, a desilication procedure is applied for addressing large concentrations of silicate anions in aqueous solution of alkali metals tungstates that are removed by minute controlled additions of aluminum sulfate, $Al_2(SO_4)\cdot 18H_2O$, CAS No. [7784-31-8], and magnesium sulfate heptahydrate $MgSO_4\cdot 7H_2O$, CAS No. [10034-99-8], to the hot solution heated at 70-80° C. to trigger the double precipitation of magnesium and aluminum silicates according to the two reaction schemes:

$$2M_2SiO_3 + Al_2(SO_4)_3 + 2M_2CO_3 = M_2Al_2Si_2O_8 + 3M_2SO_4 + 2CO_2$$

$$2M_2SiO_3 + 2MgSO_4 + M_2SO_4 = Mg_2SiO_3 + 3M_2SO4 + 2CO_2$$

Because the above chemical reactions will introduce foreign sulfate anions along with traces of aluminum and magnesium, we did prefer to purify our crude cesium tungstate solution in-situ by triggering the irreversible precipitation cesium silico-tungstate hydrate (CSTH) with the chemical formula $Cs_4[SiW_{12}O_{40}]\cdot 9H_2O$ and a mass density of 3,540 kg/m³ that forms upon heating the saturated solution for prolonged periods in a PTFE equipment thus triggering the precipitation of a bright white and dense gel. The extremely low water solubility of CSTH which is only 50 milligrams of salt per kilogram of pure water at room temperature and even lower in the concentrated solution of $Cs_2WO_4$ ensured the most efficient for the removal of silica.

Example 6: Removal of free alkalinity: Because at high temperature especially above 700° C. any excess of cesium carbonate that did not react with tungsten (VI) oxide will be converted to $Cs_2O$ then upon water dissolution to free cesium hydroxide imparting a free alkalinity to the aqueous solution of cesium tungstate, it was of paramount importance to remove cesium hydroxide from the aqueous solutions. Among the several techniques tested, the most successful methods consisted: (1) to react for extended period of time the hot aqueous solution of cesium tungstate with yellow tungsten (VI) oxide powder that was freshly calcined, or (2) to add to the hot aqueous solution of cesium tungstate freshly precipitated hydrated tungstic acid $H_2WO_4\cdot H_2O$, CAS No. [7783-03-1]. The overall reaction schemes are as follows:

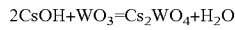

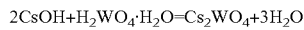

In both cases, the completion of the chemical conversion was indicated by both the step decrease in alkalinity and the visual change in color from amber like solution to a colorless solution. Afterwards, the excess unreacted tungsten compound was removed by filtration or centrifugation or a combination of both. However, when using hydrated tungstic acid because of the additional water produced it was mandatory to perform the evaporation of the solution of cesium tungstate in order to remove the excess water formed.

Example 8: Determination of the mass percentage (resp. mass density) of a cesium tungstate solution from the mass density (resp. mass percentage): The determination of the exact mass percentage (resp. mass density) of an aqueous solution of cesium tungstate can be achieved with great accuracy by measuring the mass density (resp. mass percentage) at room temperature by the use of: (1) custom made hydrometers, (2) a Mohr-Westphal hydrostatic balance, (3) liquid pycnometers, or (3) the use of calibrated synthetic ceramic beads [e.g., fluorite ($CaF_2$, 3,180 kg/m³), mullite ($Al_6Si_2O_{13}$, 3,050 kg/m³), silicon carbide (Carborundum® or moissantite) ($\alpha$-SiC, 3,160 kg/m³), and silicon nitride ($\beta$-$Si_3N_4$, 3,184 kg/m³)]. For instance the following empirical equation was established experimentally to relates the mass density, p in kg/m³, when knowing the mass percentage A of cesium tungstate in wt. % when measured at a fixed temperature of 20° C. with a sufficient accuracy for quality control purposes:

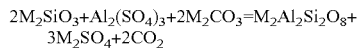

Conversely, the above equation can be rearranged to calculate the mass percentage of cesium tungstate from the measured mass density at 20° C.

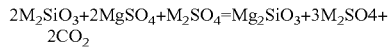

Example 9: Determination of the mass percentage (resp. mass density) of cesium tungstate solution by measuring the refractive index: Because the accurate direct determination of the mass density is a tedious process, we did observe that at a given temperature, there was a direct relationship between the refractive index and the mass density. Actually, by determining of the refractive index at 20° C. with a precision Abbé refractometer of several aqueous solutions of cesium tungstate with a given mass density, it was possible to establish an empirical equation between the refractive index, $n^{20}{}_D$, and the mass density, p in kg/m³, which is valid over the entire range at a fixed temperature of 20° C.:

$$n^{20}{}_D = 0.0000773\rho(kg/m^3) + 1.258099$$

Conversely, the above equation can be rearranged to calculate the mass density of the aqueous solution of cesium tungstate from the measured refractive index as follows:

$$\rho(kg/m^3) = 12{,}933 n^{20}{}_D - 16{,}271$$

Figure 4:
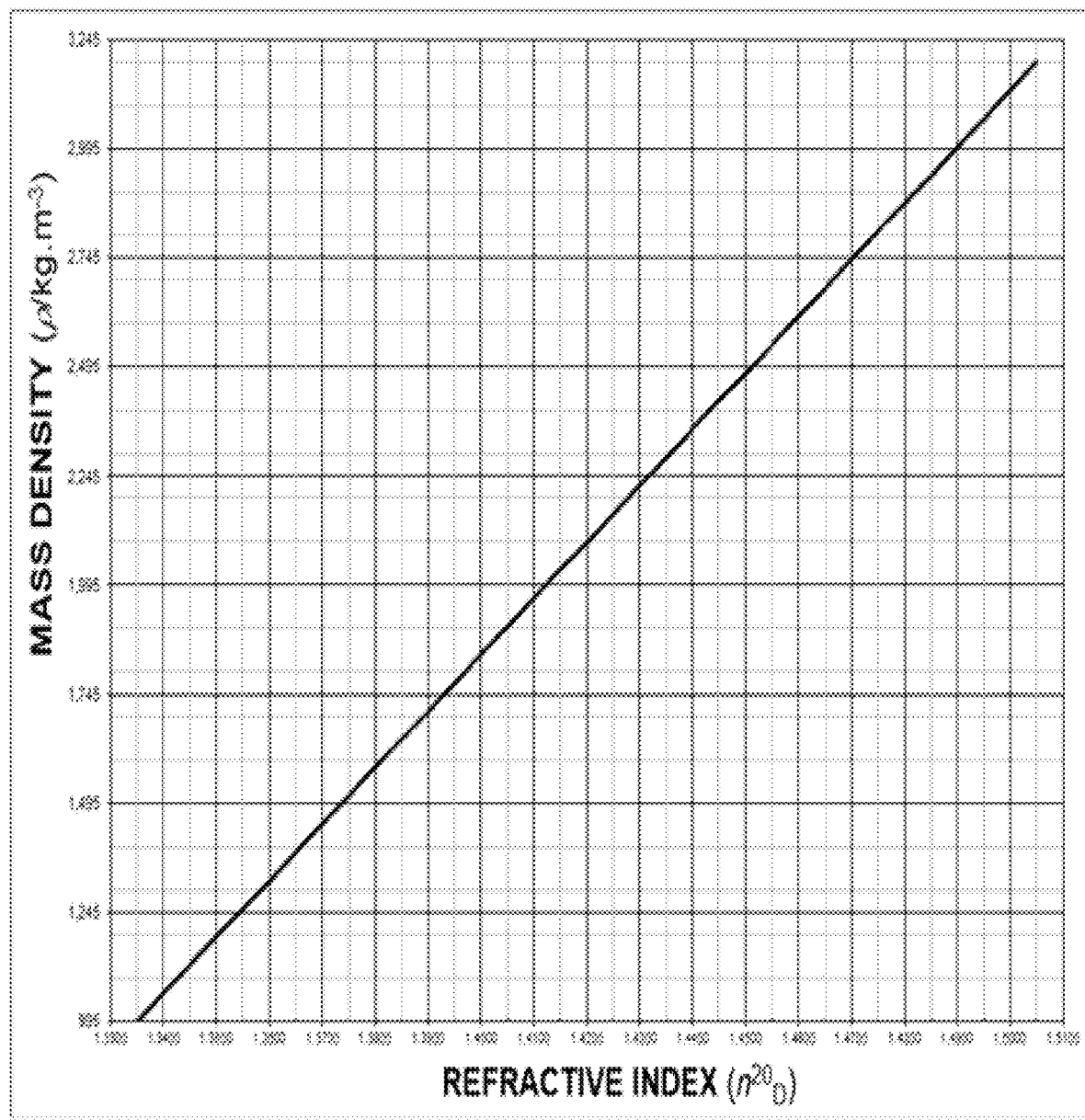
FIG. 4 shows the experimental plot at room temperature (20° C.) of the mass density vs. the refractive index of aqueous solutions of cesium tungstate to an embodiment of the present disclosure.

The plot of the above equation, that is, the mass density vs. the refractive index when both properties were measured at 20° C. is depicted FIG. 4.

Example 10: Establishing equations for performing the dilution of cesium tungstate solutions: In order to perform accurately the dilution of the saturated aqueous solution of cesium tungstate to reach a given mass percentage (resp. mass density), it requires first to establish several sets of mathematical equations involving the following physical properties: (1) the mass density of heavier solution (i.e., more concentrated), $D_A$; (2) the mass density of lighter solution (i.e., less concentrated), $D_B$; (3) the mass density of final prepared solution, $D_C$; (4) the mass fractions of cesium tungstate in the heavier (i.e., more concentrated), in the lighter (i.e., less concentrated), and in the final solution respectively, denoted, a, b, and c; (5) the masses (resp. volumes) of heavier solution (i.e., more concentrated); of lighter solution (i.e., less concentrated), and of the final solution respectively, denoted, $m_A$ ($V_A$); $m_B$ ($V_B$); and $m_C$ ($V_C$). These equations are reported in the TABLE 7. Equations implying the volumes of solutions hold because the aqueous solutions of cesium tungstate behave like those of regular non dissociated organic solutes (e.g., sucrose) with a negligible volume change upon mixing ($\delta V_M$) that is with almost no contraction nor expansion.

TABLE 7

Mathematical equations for the calculations used for the dilution of aqueous solutions and deuterated solutions of cesium tungstate.

| | | | | | | | |
|---|---|---|---|---|---|---|---|
| Mass | $m_C = m_A + m_B$ and $c \cdot m_C = a \cdot m_A + b \cdot m_B$ | | $m_A = m_C \dfrac{(c-b)}{(a-b)}$ | | $m_B = m_C \dfrac{(a-c)}{(a-b)}$ | | $m_A = m_B \dfrac{(c-b)}{(a-c)}$ |
| Volume (*) | $V_C = V_A + V_B \pm dV_M$ | | $V_A = V_C \dfrac{(D_C - D_B)}{(D_A - D_B)}$ | | $V_B = V_C \dfrac{(D_A - D_C)}{(D_A - D_B)}$ | | $V_A = V_B \dfrac{(D_C - D_B)}{(D_A - D_C)}$ |
| Density | $D_C = \dfrac{1}{\left[\dfrac{a}{D_A} + \dfrac{b}{D_B} \pm \dfrac{dV_B}{m_C}\right]}$ | | $m_A = m_C \dfrac{D_A}{D_C} \dfrac{(D_C - D_B)}{(D_A - D_B)}$ | | $m_B = m_C \dfrac{D_B}{D_C} \dfrac{(D_A - D_C)}{(D_A - D_B)}$ | | $m_A = m_B \dfrac{D_A}{D_B} \dfrac{(D_C - D_B)}{(D_A - D_C)}$ |

Notes:
(*) Equations implying the volumes of solutions hold because the aqueous solutions of cesium tungstate behaves like those of regular organic solutes (e.g., sucrose) with a negligible volume change upon mixing ($dV_M$).

For instance for calculating the volume of pure deionized water (B) to be added to a heavier solution A of mass density: $D_A$=3,195 kg/m³ for preparing one liter of a final solution C having a mass density: $D_C$=2,960 kg/m³ at 20° C. and assuming that the volume change during mixing is negligible, we can use the above equations based on volumes and densities. Therefore knowing the mass density of pure water at 20° C.: $D_B$=998.204 kg/m³ the volume of water to be added is 107 mL with 893 mL of the denser solution A.

On the other hand, if we need to prepare 3 kilograms of a final solution C having a mass density: $D_C$=2,850 kg/m³ at 20° C. with a heavier solution A of mass density: $D_A$=3,020 kg/m³ the mass of pure deionized water is calculated using the set of equations involving masses and densities. Therefore knowing the mass density of pure water at 20° C.: $D_B$=998.204 kg/m³ the mass of pure water to add is 88.3 grams to 2,911.7 grams of the denser solution A.

Finally, if we need to prepare a concentrated solution A having a mass density: $D_A$=2,960 kg/m³ at 20° C. from 500 grams of a lighter solution C having a mass density: $D_C$=2,000 kg/m³ the mass of water to remove by evaporation can be calculated using the above equations between A and C involving their masses and densities. Therefore knowing the mass density of pure water at 20° C.: $D_B$=998.204 kg/m³ the mass of solution A that can be prepared from C is 377.9 grams then the amount of water to be removed is simply obtained by subtraction, that is, 122.1 grams.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

The invention claimed is:

1. A process for producing dense aqueous or deuterated solutions of cesium tungstate having a chemical formula $Cs_2WO_4$ using a high temperature chemical process comprising:
  (a) preparing a mixture by blending and mixing tungsten oxide compounds with cesium compounds or a mixture thereof;
  (b) roasting the mixture in air producing a solid sintered mass containing cesium tungstate; and
  (c) leaching or dissolving the solid sintered mass containing cesium tungstate in water or deuterium oxide or a mixture thereof for producing the dense aqueous or deuterated solution of cesium tungstate having the chemical formula of $Cs_2WO_4$, wherein the high temperature is above 600° C., and wherein the roasting is performed at an operating temperature from 300° C. to 1000° C.

2. The process of claim 1, wherein the tungsten oxide compounds consist of either pure tungsten oxides with the chemical formula $W_3O$, $WO_2$, $W_4O_{11}$, $W_{18}O_{49}$, $W_{20}O_{58}$, $WO_3$, or inorganic compounds containing tungsten oxides either mixed physically or combined chemically with other metallic oxides.

3. The process of claim 1, wherein the tungsten oxide compounds consist of natural or synthetic metal tungstates, or synthetic and mineral concentrates or wolframite and scheelite or tungsten by-products obtained from metallurgical processing of hardmetal, or spent catalysts or swarf or scrap tungsten metal and its alloys or tungsten carbides or residues from the chemical processing of tantalum, tin, and tungsten ores and concentrates or a mixture thereof.

4. The process of claim 1, wherein the cesium compound is made of cesium carbonate or of cesium sulfate or of cesium hydroxide or a mixture thereof.

5. The process of claim 1, wherein the tungsten oxide compounds exhibit a particle size below 0.500 mm.

6. The process of claim 1, wherein a mass ratio of cesium (Cs)-to-tungsten (W) ranges from 1.3 kg of cesium per kg of tungsten to 1.6 kg of cesium per kg of tungsten.

7. The process of claim 1, wherein, the roasting is performed during a period that ranges from two (2) hours to six (6) hours.

8. The process of claim 1 wherein, the dense solution or the deuterated solution of cesium tungstate undergoes a solid-liquid separation step by gravity settling, or filtration or centrifugation or combinations thereof in order to remove unreacted solids, precipitated solids, and solid impurities.

* * * * *